United States Patent
Brockley (10) Patent No.: US 12,140,224 B2
(45) Date of Patent: Nov. 12, 2024

(54) VEHICLE CONTROL SYSTEM

(71) Applicant: JAGUAR LAND ROVER LIMITED, Warwickshire (GB)

(72) Inventor: Nick Brockley, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/913,583

(22) PCT Filed: Mar. 24, 2021

(86) PCT No.: PCT/EP2021/057605
§ 371 (c)(1),
(2) Date: Sep. 22, 2022

(87) PCT Pub. No.: WO2021/191298
PCT Pub. Date: Sep. 30, 2021

(65) Prior Publication Data
US 2023/0151886 A1    May 18, 2023

(30) Foreign Application Priority Data
Mar. 25, 2020 (GB) ..................... 2004331

(51) Int. Cl.
*F16H 59/14* (2006.01)
*F16H 59/18* (2006.01)
(Continued)

(52) U.S. Cl.
CPC ......... *F16H 59/18* (2013.01); *F16H 61/0437* (2013.01); *F16H 63/50* (2013.01); *F16H 2059/147* (2013.01); *F16H 2061/0492* (2013.01)

(58) Field of Classification Search
CPC ...... F16H 59/18; F16H 61/0437; F16H 63/50; F16H 2059/147; F16H 2061/0492; F16H 59/40; F16H 2063/504; F16H 59/14
See application file for complete search history.

(56) References Cited

U.S. PATENT DOCUMENTS

2002/0082764 A1\* 6/2002 Ikeda ................. B60K 31/04
123/352
2005/0101435 A1    5/2005 Cowan
(Continued)

FOREIGN PATENT DOCUMENTS

| JP | H0914431 A | 1/1997 |
|---|---|---|
| JP | H109377 A | 1/1998 |

OTHER PUBLICATIONS

Search Report under Section 17 for Application No. GB2004331.1 dated Sep. 29, 2020.
(Continued)

*Primary Examiner* — Tisha D Lewis
(74) *Attorney, Agent, or Firm* — Carlson, Gaskey & Olds, P.C.

(57) ABSTRACT

A control system (32, 33) for a vehicle (10), the control system (32, 33) comprising one or more controllers, the control system (32, 33) being configured to: receive a transmission speed signal that is indicative of an output speed of a transmission (24) of the vehicle (10) as the transmission (24) performs a gearshift; receive a driver demand signal that is indicative of a driver demand for acceleration of the vehicle (10) during the gearshift; and determine a torque demand signal for an engine (20) of the vehicle (10) in accordance with the transmission speed signal and the driver demand signal.

11 Claims, 4 Drawing Sheets

(51) Int. Cl.
    *F16H 61/04*         (2006.01)
    *F16H 63/50*         (2006.01)

(56)                   References Cited

U.S. PATENT DOCUMENTS

| | | |
|---|---|---|
| 2005/0143222 A1 | 6/2005 | Shim |
| 2007/0289400 A1 | 12/2007 | Mitchell et al. |
| 2008/0081735 A1 | 4/2008 | Runde |
| 2010/0063693 A1* | 3/2010 | Lee ................ F16H 61/21 |
| | | 477/90 |
| 2015/0184740 A1 | 7/2015 | Masunaga et al. |
| 2018/0244260 A1* | 8/2018 | Ruybal ............. B60W 10/02 |
| 2018/0257633 A1* | 9/2018 | Meyer ............. B60W 10/06 |
| 2019/0048999 A1 | 2/2019 | Sato et al. |
| 2019/0092313 A1 | 3/2019 | Lee et al. |

OTHER PUBLICATIONS

Examination Report under Section 18(3) for Application No. GB2004331.1 dated Apr. 29, 2022.
International Search Report and Written Opinion of the International Searching Authority for International application No. PCT/EP2021/057605 dated Jun. 7, 2021.
Communication pursuant to Article 94(3) EPC, European Application No. 21 716 609.9 dated Oct. 6, 2023.

* cited by examiner

VEHICLE CONTROL SYSTEM

TECHNICAL FIELD

The present disclosure relates to a vehicle control system and a related method. In particular, the present disclosure relates to a vehicle control system for managing torque demand during a transmission gearshift. Aspects of the invention relate to a control system, to a method, to a vehicle, to computer software and to a non-transitory computer-readable medium.

BACKGROUND

Automatic and automated vehicle transmissions bring various benefits, both in terms of vehicle performance and in relieving the driver of the responsibility for changing gear ratios. However, controlling automated gearshifts to provide the response that a driver desires and expects is an ongoing challenge. One aspect of this challenge is to ensure that upshifts during vehicle acceleration do not disrupt the smoothness and steadiness of the acceleration, which is also referred to as 'driveability'.

Various techniques are employed to maintain acceptable driveability in normal operation. This includes managing a torque demand that is sent to a control unit responsible for operating an engine of the vehicle, the torque demand representing the level of torque that the vehicle engine is required to develop at a given moment. The engine torque demand is impacted by various factors, including the vehicle load, the vehicle speed, the gear ratio, ambient conditions, a selected drive mode and a driver demand for acceleration via an accelerator pedal. Each of these variables is susceptible to rapid changes as operating conditions vary. For example, the driver demand for torque may change quite suddenly, and occasionally unintentionally. Similarly, the vehicle load is subject to abrupt changes, for example if the road gradient alters.

The transient nature of the various inputs to the engine torque demand lead to accumulated high-frequency deviations in the combined signal defining the overall torque demand.

Meanwhile, components of a typical drivetrain have an effective elasticity that impacts the manner in which they respond to step changes in torque demand, which can cause oscillatory behaviour. Moreover, the various actuators within a vehicle engine have non-zero, dissimilar response times, causing a lag in a response to a step input and potentially causing operation of the actuators to move out-of-phase. This can also produce corresponding effects in systems associated with the engine, such as aircharge systems.

In this context, if a raw torque demand signal were fed directly to the engine actuators it could lead to unstable operation of the engine, manifesting as poor driveability and potentially drivetrain 'clonk', 'shunt' or 'shuffle'. Accordingly, to avoid this and to preserve driveability, the torque demand is filtered to smooth sharp changes in the demand to a trajectory that the engine actuators can cope with and that will not induce vibration in the drivetrain.

This filtering is performed by dedicated driveability filters. Tuning such filters for optimised performance is a complex task, as a balance must be struck between smoothing the torque demand to maintain driveability whilst ensuring that the demand isn't filtered so heavily that the vehicle might be perceived as unresponsive. Moreover, the driveability filter must account for a wide range of operating conditions and driving styles. Configuring the driveability filters represents a considerable development investment, often accounting for a significant proportion of the overall costs for developing the vehicle powertrain control system. Accordingly, once the filters have been tuned and readied for production, there is a great disincentive against modifying them.

In this context, managing upshifts in an automatic transmission to provide a 'power-on' response, in which the output torque is held relatively steady during the upshift, represents a specific challenge. Such upshifts must be delivered with refinement and with minimal loss of power, to provide the required feel for the driver. This typically means that the vehicle should accelerate substantially as though no upshift had occurred, albeit with a slight drop in the power felt by the driver around the upshift in line with their expectations, noting that such upshifts typically occur when the vehicle speed has steadied or when the engine is approaching full load.

Opposing this objective is the fact that the torque output of the transmission drops non-linearly during an upshift as the clutches within the transmission engage and disengage, until the transmission settles at the new gear ratio. Known approaches attempt to compensate for this torque variation by increasing the engine torque during an upshift. However, due to the time constants involved a lag arises between the initial drop in torque at the start of the upshift and the effect of the compensation, which is sometimes referred to as a 'torque hole'. This may be exacerbated by the tendency of the driveability filter to remove such compensation from the torque demand. Thus, such approaches fail to achieve the required level of refinement.

It is against this background that the present invention has been devised.

SUMMARY OF THE INVENTION

Aspects and embodiments of the invention provide a control system for a vehicle, a vehicle, a method, computer software and a non-transitory, computer-readable storage medium.

An aspect of the invention provides a control system for a vehicle, the control system comprising one or more controllers. The control system is configured to receive a transmission speed signal that is indicative of an output speed of a transmission of the vehicle as the transmission performs a gearshift. The control system is also configured to receive a driver demand signal that is indicative of a driver demand for acceleration of the vehicle during the gearshift. The control system is further configured to determine a torque demand signal for an engine of the vehicle in accordance with the transmission speed signal and the driver demand signal.

Determining the torque demand signal based on the transmission speed signal and the driver demand signal enables the control system to tailor the torque demand to provide a desired response by making use of the inherent behaviour of the transmission during the gearshift. For example, the control system may be configured to apply a torque ratio value to the transmission output speed to determine an indicated engine speed, and to determine the torque demand signal in accordance with the indicated engine speed and the driver demand signal. The torque ratio may vary during the gearshift, for example to reflect the actual variation of the transmission torque ratio. In this way, the control system can determine the torque demand as though the torque ratio and the speed ratio of the transmission remain aligned during the gearshift, which inherently adds compensation for torque losses during the gearshift.

In such embodiments, the control system may be configured to: receive an initial gear signal that is indicative of a gear ratio of the transmission at the start of the gearshift; receive a target gear signal that is indicative of a target gear ratio of the transmission; and determine the torque ratio value based on the initial gear signal and the target gear signal. Alternatively, or in addition, the control system may receive a signal indicative of the torque ratio of the transmission and take such a signal into account in determining the torque ratio value that is used to produce the indicated engine speed.

The control system may be configured to determine the torque ratio value based on an elapsed time since a value of the target gear signal changed. The control system may be configured to determine the torque ratio value using a predefined function, for example a mathematical function and/or a function defined to achieve a desired outcome. The predefined function may be wholly predetermined and artificial. Alternatively, the control system may be configured to predict variance in the torque ratio of the transmission during the gearshift to determine the torque ratio. Accordingly, the torque ratio may be determined using the predicted actual torque ratio during the gearshift, with modifications optionally applied to shape the profile of the torque ratio over the course of the gearshift as required to yield a desired outcome. Such modifications may include filtering the signal and/or applying a transformation.

The control system is optionally configured to determine the indicated engine speed in accordance with a state of a torque converter of the transmission.

In some embodiments, the control system is configured to determine the torque demand signal using a predefined function. For example, the control system may use a pedal progression map to convert an indicated engine speed and a driver demand, for example an indicated accelerator pedal position, into a torque demand. Alternatively, or in parallel, the predefined function may be expressed as a look-up table or as a mathematical function.

The control system may be configured to determine the torque demand signal to provide a predetermined change in power output from the transmission during the gearshift and/or to compensate for a torque loss in the transmission during the gearshift.

The control system may comprise a signal processor configured to modify the torque demand signal to produce a modified torque demand signal, and a filter, such as a driveability filter, configured to process the modified torque demand signal to produce a filtered torque demand signal for the engine of the vehicle. The signal processor may be configured to add a modifier value to the torque demand signal to produce the modified torque demand signal. The modifier value may be a function of any one or more of: a driver demand; a difference between the torque demand signal and the filtered torque demand signal; and a time constant of the filter.

The one or more controllers may collectively comprise at least one memory device electrically coupled to the at least one electronic processor and having instructions stored therein, in which case the at least one electronic processor is configured to access the at least one memory device and execute the instructions thereon so as to determine the torque demand signal.

The one or more controllers may collectively comprise an input configured to receive signals indicative of any of: an output speed of a transmission of the vehicle as the transmission performs a gearshift; a driver demand for acceleration of the vehicle during the gearshift; an upshift of the transmission; a speed of the engine; a position of an accelerator pedal of the vehicle; and a state of the transmission.

The invention also extends to a vehicle comprising the control system of the above aspect.

Another aspect of the invention provides a method of operating a vehicle. The method comprises: receiving a transmission speed signal that is indicative of an output speed of a transmission of the vehicle as the transmission performs a gearshift; receiving a driver demand signal that is indicative of a driver demand for acceleration of the vehicle during the gearshift; and determining a torque demand signal for an engine of the vehicle in accordance with the transmission speed signal and the driver demand signal.

Further aspects of the invention provide computer software that, when executed, is arranged to perform a method of the above aspect, and a non-transitory, computer-readable storage medium storing instructions thereon that, when executed by one or more electronic processors, causes the one or more electronic processors to carry out the method of the above aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In general terms, embodiments of the invention provide improved torque management for automated transmissions to promote driveability during gearshifts, including both upshifts and downshifts. The embodiments described below concentrate on upshifts at partial load under steady driver demand, which is a particular scenario for which an improved response and 'feel' is desired, but similar principles apply to other gearshift scenarios. Upshifts performed at full load require a transient over-torque, which can be achieved and is applicable to embodiments of the invention, but is not described below for simplicity.

During an upshift, a vehicle transmission moves from a first gear ratio to a second gear ratio, the speed ratio of the second gear ratio being lower than the speed ratio of the first gear ratio. It is noted that gears are typically numbered in the opposite direction to that in which the gear ratio alters. For example, a 'first gear' is typically the highest gear ratio, while the 'top gear' is the lowest gear ratio.

It is also noted that an automotive transmission is typically configured to provide a step down in rotational speed between the relatively high engine speed and the much lower speed of the road wheels, although for some arrangements the highest gears produce a step up in speed, or 'overdrive ratio'. So, a lower numbered gear having a higher gear ratio entails a greater speed reduction relative to the engine speed. Conversely, a step down in speed in the transmission produces a corresponding step up in torque. Thus, for a given engine speed and torque input, an upshift causes the output torque to reduce and the output speed to increase; although in practice an upshift is usually accompanied by a reduction in engine speed, while the output speed of the transmission is substantially unchanged.

A typical automatic transmission has several torque paths, each defining a respective gear ratio. A specific torque path defining a particular gear ratio is selected by engaging a combination of clutches. A gearshift therefore involves disengaging an off-going clutch associated with the or each gear involved in the initial gear ratio, whilst engaging an oncoming clutch associated with the gear(s) involved in the new gear ratio.

At the start of an upshift, the off-going clutch is fully engaged and has no slip. Accordingly, the speed and torque ratios are defined by the engaged gear ratio.

A gearshift commences when a target gear signal changes and no longer matches the current gear. The first phase of the upshift is the 'fill phase', in which the oncoming clutch chamber is filled with oil and the clutch is brought to a position where further engagement will transmit torque.

Next, the upshift enters a 'torque phase', during which the torque applied to the oncoming clutch ramps up to a level that can sustain the new gear ratio while the off-going clutch releases its holding capacity. The speed ratio must remain at that of the off-going clutch during the torque phase to avoid the off-going clutch applying a negative torque. By the end of the torque phase, the off-going clutch is fully disengaged and the oncoming clutch is fully engaged. Thus, the oncoming clutch transmits all available torque through the new gear ratio, and so the torque ratio has changed. The oncoming clutch is slipping at this stage as the speed ratio has not yet altered.

The torque phase is followed by an 'inertia phase', during which the oncoming clutch maintains its torque and reduces its the slip as the speed ratio changes, and the combustion torque produced in the engine is reduced to allow the engine to decelerate according to its inertia and the difference between the clutch torque and the combustion torque. It is conventional to reduce the engine torque produced by combustion during the inertia phase, to allow for torque arising from deceleration of the engine towards its new speed, such that the net output torque from the engine is steady.

At the end of the inertia phase the oncoming clutch is no longer slipping and so the speed and torque ratios align.

The upshift completes by increasing the oncoming clutch pressure to increase the clutch torque capacity. As the oncoming clutch is not slipping, it transmits all torque available from the engine, even though it has additional capacity.

The torque ratio of the transmission changes non-linearly during the torque phase of an upshift as the torque ratio migrates from that of the initial gear ratio to that of the new gear ratio. The magnitude of the torque ratio at any given time during the torque phase is a function of the manner in which input torque is divided between each of the clutches, taking any losses into account, and so varies in a complex manner during the torque phase. The output torque from the transmission is also influenced by any changes to the input torque from the vehicle engine, which can therefore be used to compensate changes in the transmission torque ratio to steady the torque output from the transmission.

So, during an upshift the torque ratio changes first during the torque phase, and then the speed ratio changes during the inertia phase. Accordingly, the torque ratio decouples from the speed ratio during the upshift. Hypothetically, if the engine torque does not change during an upshift, the transmission output torque drops by an amount corresponding to the change in torque ratio.

The skilled reader will appreciate that the sequence of events is substantially reversed for a downshift. In particular, the inertia phase precedes the torque phase in a downshift, allowing the engine to accelerate to the speed required for the new, higher gear ratio, before the torque ratio changes. Embodiments of the invention are applicable to downshifts in a similar manner to upshifts, for example to improve engine load control and to reduce wheel torque overshoot.

Noting the objective to maintain a steady torque output from the transmission during upshifts, as noted above known arrangements apply an offset to the torque output by an engine of the vehicle to combat torque losses in the transmission during an upshift. However, this relatively crude approach has been found to be ineffective due to the time constants associated with the system, including the response times of some engine actuators, whilst also having some unintended impacts on other aspects of vehicle operation.

In this context, embodiments of the invention take a more sophisticated approach by varying the torque demand generated during an upshift to migrate the torque demand towards the value that will be required once the upshift completes in a smooth, progressive manner. This is achieved by determining the torque demand using a modified engine speed signal instead of the real engine speed.

In this respect, in normal operation a torque demand based on driver input is often generated dynamically using a pedal progression map, which translates indications of the engine speed and an accelerator pedal position into a torque demand. Embodiments of the invention manipulate this process to achieve improved torque management during gearshifts, by substituting the real engine speed for a modified engine speed that is determined to produce a torque demand that will provide a desired response as the gearshift progresses; whilst still taking the driver input into account.

Thus, the proposed approach elegantly implements torque compensation during gear changes into an existing process for generating a torque demand and without necessarily having to modify the existing pedal progression map; although the pedal progression map may be manipulated to tailor the response as desired.

In turn, the modified engine speed is generated dynamically in real-time during a gearshift using a measurement of the transmission output speed and a predetermined function that is nominally representative of the torque ratio of the transmission over the course of the gearshift. The modified engine speed may also take into account the state of the transmission, including the slip condition of a torque converter for example.

Accordingly, the modified engine speed is calculated as though the speed ratio and the torque ratio are not decoupled during the upshift, in that the output transmission speed is converted directly into an indicated input transmission speed using a modelled torque ratio. Since the torque ratio and speed ratio realign by the end of the gearshift, this approach inherently moves the torque demand towards the value that will be required once the new gear ratio is fully engaged in a gradual, controlled manner. This compensates for losses during the gearshift without introducing any sudden changes in demand or causing overshoot, ensuring that the resulting torque demand does not cause problems when implemented in the engine.

The predetermined function representing the modelled torque ratio profile typically follows the same general trend as the expected actual torque ratio profile of the transmission as the upshift progresses, and indeed may take the predicted torque ratio as a starting point. Accordingly, the modified engine speed substantially corresponds to the engine speed that would be expected if the transmission speed ratio were aligned with the torque ratio during the gearshift.

However, the predetermined torque ratio profile is not necessarily directly related to the actual torque ratio, but may instead be manipulated such that it will generate a modified engine speed that yields a desired torque demand when fed to the pedal progression map, in turn producing a certain 'feel' for the upshift. For example, the modelled torque ratio may be produced by blending the predicted actual torque ratio with a predefined function that calibrates for system characteristics and the desired response and/or by filtering the predicted torque ratio.

This strategy of basing a torque demand on predetermined, modified signals, in combination with a driver input and the measured transmission output speed, allows the engine output to compensate for transmission losses during an upshift effectively, whilst also managing the torque demand in a manner that accounts for the response times of the engine actuators and the susceptibility of the drivetrain to vibration. Accordingly, upshifts can be handled with greater refinement to allow the transmission output to be tailored more closely to a desired 'feel', for example for 'power-on' upshifts.

To ensure that the compensation applied through the torque demand based on the modified engine speed is not removed or delayed by a driveability filter without modifying the driveability filter itself, in a complementary part of the strategy the resulting torque demand signals are adapted to compensate for the effect of the driveability filter, so that the output from the driveability filter contains the desired compensation. Moreover, the correction to the demand signal is applied in such a way that changes in driver demand during an upshift continue to be filtered in the usual way.

In this respect, the driveability filter is not able to distinguish between different types of torque demand, and so will filter torque demands arising from a driver input in the same way as torque demands representing compensation for transmission losses during a gearshift. However, for the torque compensation strategy to be effective, the compensation created using the modified engine speed must pass through the driveability filter, while changes in driver input should continue to be filtered as in normal driving.

These elements of the approach shall be considered in more detail later. First, to provide context for the invention a vehicle 10 that is suitable for use in embodiments of the invention shall be described with reference to FIG. 1.

Figure 1:
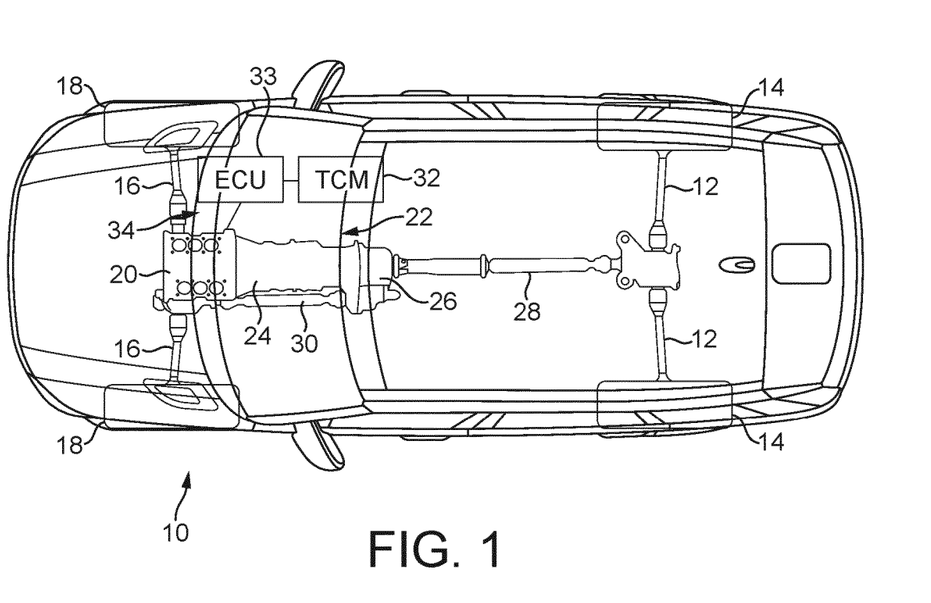
FIG. 1 is a schematic illustration of a vehicle that is suitable for use with embodiments of the invention.

The vehicle 10 adopts an independent suspension layout of a kind that will be familiar to the skilled person, in which a pair of mutually-opposed rear axles 12 support respective coaxial rear road wheels 14, and a pair of mutually-opposed front axles 16 support respective coaxial front road wheels 18.

The vehicle 10 includes an internal combustion engine 20 that is disposed on a central longitudinal axis of the vehicle 10 between the front road wheels 18. In this example, the engine 20 drives all four road wheels 14, 18, so that the vehicle 10 is a 'four-wheel drive' vehicle.

The engine 20 forms part of a vehicle powertrain, which also includes a drivetrain 22 that is configured to transmit torque from the engine 20 to the road wheels 14, 18. The drivetrain 22 includes an automatic transmission 24 that extends longitudinally between the engine 20 and a transfer case 26, to transfer torque output by the engine 20 to the transfer case 26. In turn, the transfer case 26 is configured to divide the torque for delivery to both a rear driveshaft 28 and a front driveshaft 30.

The rear driveshaft 28 extends longitudinally and coaxially with the transmission 24 to couple to and transmit torque to the rear axles 12 and thus drive the rear road wheels 14. The front driveshaft 30 extends in the opposite direction to the rear driveshaft 28 and in parallel to the transmission 24, to couple to the front axles 16 beneath the engine 20 and thereby transmit torque to the front axles 16 to drive the front road wheels 18.

The automatic transmission 24 may be of any suitable type, for example a hydraulic automatic transmission. The internal components of the automatic transmission 24 are not shown in FIG. 1 to avoid obscuring the invention with unnecessary detail, but the skilled person will appreciate that such transmissions typically include a set of planetary gearsets to provide the required gearing ratios, and a torque converter to couple the engine 20 output to the planetary gearsets.

In other examples, manual-automated transmissions such as dual-clutch transmissions are also applicable to embodiments of the invention. In general terms, embodiments of the invention find application for use with any transmission in which a torque ratio alters before a speed ratio during upshifts.

The automatic transmission 24 is controlled by a transmission control module (TCM) 32, which communicates with an engine control unit (ECU) 33 that is responsible for operating the engine 20. In other embodiments, a powertrain control module (PCM) may combine the functions of the ECU 33 and the TCM 32. Conversely, the torque management functionality presently described may be distributed across any number of controllers in the vehicle 10.

The TCM 32 receives input data from a suite of on-board sensors and generates control signals that are either implemented directly if they apply to the transmission 24, or are issued to the ECU 33 or another controller as appropriate. Correspondingly, the ECU 33 receives input data relevant to operating the engine 20 and generates control signals governing engine operation. The signals received and issued by the TCM 32 and the ECU 33 are transmitted by any suitable means, for example using a vehicle CAN bus 34.

The input data received by the TCM 32 includes indications of, for example, the currently-selected gear, engine speed, engine load, road wheel speed, exhaust gas flow rate, engine intake pressure, vehicle operating mode, accelerator pedal position and many more. The skilled reader will appreciate that obtaining such data from standard on-board sensors is entirely conventional and common to most modern vehicles, and so this will not be described in more detail here.

The TCM 32 is responsible for effecting upshifts and downshifts in the transmission 24, and issues control signals to the transmission 24 in this respect. Such control signals therefore typically consist of either a command to upshift, namely to select a lower gear ratio than that at which the transmission 24 is currently operating, or a command to downshift, namely to select a higher gear ratio than is currently in use. Typically, upshift or downshift commands effect an incremental change in gear ratio to adopt an adjacent gear ratio, but it is possible for a command to effect an upshift or a downshift that skips the adjacent gear ratio in some conditions.

Gearshifts are implemented in accordance with a selected gear shift map, which defines the points at which an upshift or a downshift is triggered based on vehicle operating parameters, in particular the engine speed and the position of the accelerator pedal. The TCM 32 selects from a set of gear shift maps according to instantaneous operating conditions. For example, if the automatic transmission 24 is set to a 'sport' operating mode, the TCM 32 selects a corresponding gear shift map—which would typically exhibit relatively aggressive gear change behaviour in which gear changes are triggered at relatively high engine speeds—and controls the transmission 24 accordingly.

The TCM 32 also generates a torque demand representing the torque output required from the engine 20 based on the present state of the transmission 24, which takes into account all relevant factors, including: the accelerator pedal position; a vehicle load; ambient conditions; and torque demands arising from the state of the transmission 24, in particular to compensate for a changing torque ratio in the event of an upshift and a slip condition of a torque converter if present.

Specifically, the TCM 32 generates a torque demand signal based on parameters within its remit, which for the purposes of the present disclosure primarily relate to the state of the transmission 24 and, in particular, any forthcoming upshift requests. Such a torque demand signal is then passed to the ECU 33 to be implemented.

Figure 4:
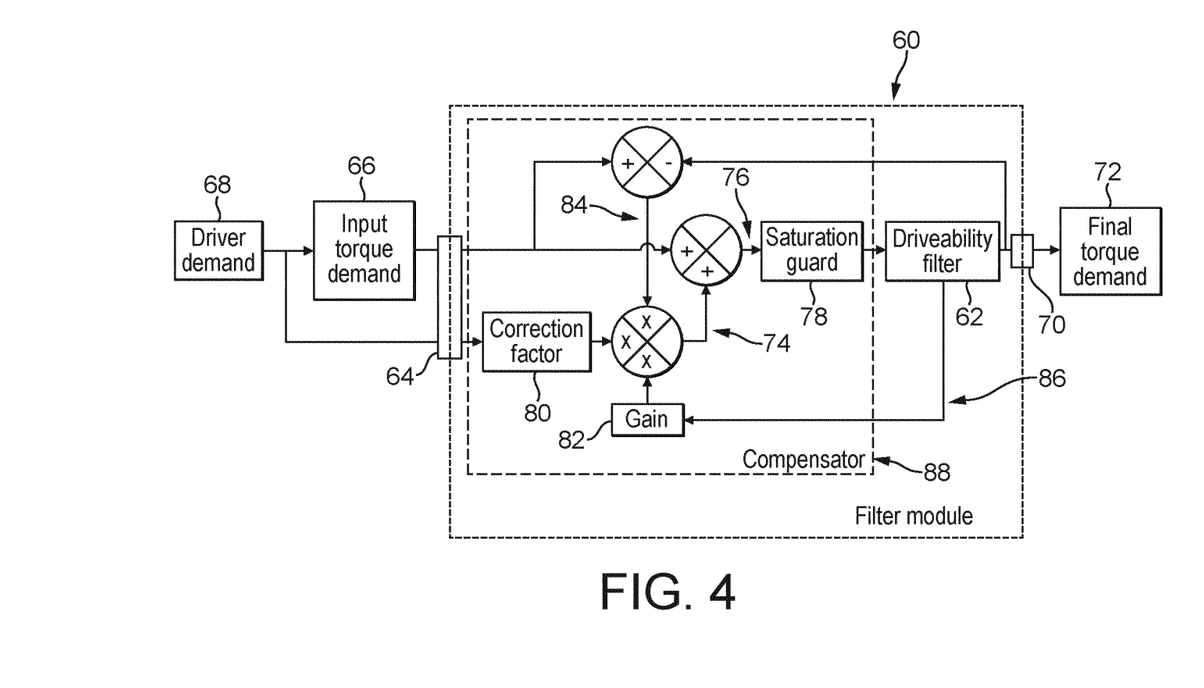
FIG. 4 shows in block-diagram form a filter module in accordance with an embodiment of the invention for processing torque demand signals.

The torque demand generated by the TCM 32 is filtered using a filter module that includes a driveability filter and further processing blocks. The resulting filtered signal is then implemented directly by the ECU 33 by operating the engine 20 accordingly. The filter module is shown in FIG. 4 and shall be described later. First, FIG. 2 represents time plots of various vehicle parameters during an upshift, to illustrate the relationships between these variables.

Figure 2:
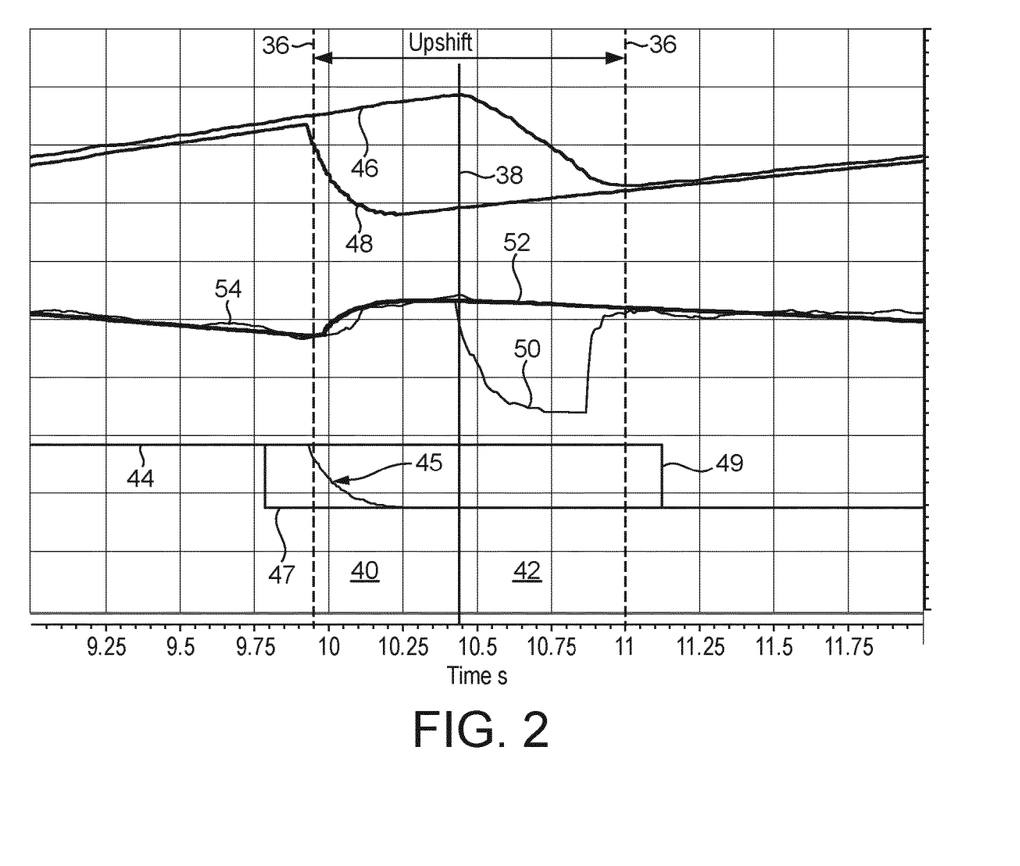
FIG. 2 is a timechart showing a range of vehicle operating parameters for the vehicle of FIG. 1 during a transmission upshift.

In FIG. 2, the duration of the main part of an upshift is indicated by a pair of vertical dashed lines 36. Between the vertical dashed lines, a solid vertical line 38 indicates a transition between a torque phase 40 and an inertia phase 42 of the upshift.

Towards the bottom of the graph of FIG. 2, a generally horizontal first plot 44 represents the modelled torque ratio of the transmission 24 before, during and after the upshift. As expected, the portions of the first plot 44 lying outside the region corresponding to the upshift exhibit a step-change in torque ratio, indicating that the transmission 24 has moved from a first gear ratio to a second, higher numbered gear ratio having a lower torque ratio.

Before the upshift starts, a requested gear signal 47 undergoes a step change from the first gear ratio to the second gear ratio, indicating that a new gear has been requested. It is noted that this strictly represents the start of the upshift, at which point the transmission 24 prepares for the upshift, in particular to prepare the clutches as described above.

A selected gear signal 49 steps down in a complementary manner shortly after the upshift completes, indicating to the system that the upshift has finished as the requested gear signal 47 matches the selected gear signal 49. The delay between the second line 36 designating the end of the inertia phase of the upshift and the change in the selected gear signal 49 indicates a period in which the transmission 24 settles after the inertia phase 42, including increasing the capacity of the oncoming clutch as noted above.

The change in the requested gear signal 47 triggers the torque phase 40 with a known lag, which is used to synchronise a moment at which a modelled torque ratio is implemented and the real engine speed is substituted for a modified engine speed, as explained below.

In this respect, during the torque phase 40 of the upshift the first plot 44 exhibits a downward trend defining a curved portion 45 of the first plot 44, until the torque ratio settles at a new level at a time corresponding to the transition point where the torque phase 40 ends and the inertia phase 42 begins. As noted above, the variation in the torque ratio indicated by the curved portion 45 represents a modelled torque ratio, which does not necessarily reflect the reality of the gradual transition between the respective torque ratios of the initial gear ratio and the new gear ratio during the torque phase 40. Instead, the shape of the curved portion 45 is defined in advance through calibration and modelling to yield a desired response from the engine 20 during the upshift. It is noted that the modelled torque ratio is not expected to deviate greatly from the real torque ratio, however.

The modelled torque ratio is used to generate a modified engine speed in real-time during the upshift, the modified engine speed being produced by converting a measurement of the transmission output speed using the instantaneous value of the modelled torque ratio, also taking the locking state of a torque converter of the transmission 24 into account. This assumes that the speed ratio is aligned with the torque ratio, which as already noted is not the case until the inertia phase completes. It follows that the modified engine speed does not correspond to the real engine speed.

This is illustrated at the top of the graph, which shows a second plot 46 representing the real engine speed alongside a third plot 48 representing the modified engine speed.

As the second plot 46 indicates, the real engine speed rises gradually before the upshift commences and continues to rise at approximately the same rate throughout the torque phase 40 of the upshift. Then, once the inertia phase 42 commences the real engine speed drops steadily as the new gear ratio engages, until the engine speed settles at a new, lower level once the upshift completes in accordance with the new speed ratio.

In this example, the real engine speed can be considered substantially to correspond to the transmission input speed for simplicity, taking into account any slip allowed in a torque converter of the transmission 24. In practice, torque converters are typically operated to allow a small amount of slip, such that the transmission input speed lags behind the real engine speed.

Meanwhile, aside from a small offset due to slip of the torque converter, the modified engine speed corresponds to the real engine speed before and after the upshift, when the speed ratio is aligned with the torque ratio. However, during the upshift the modified engine speed departs from the real engine speed, and indeed follows almost an opposite trend. This is because the modified engine speed varies as though the speed ratio varies in alignment with the torque ratio during the torque phase 40 and the inertia phase 42, as noted above.

Specifically, the modified engine speed drops sharply during the torque phase 40 of the upshift, before climbing gradually in the inertia phase 42. Notably, the real and modified engine speeds realign at the end of the upshift, since the modelled torque ratio reflects the real torque ratio at this point, and moreover the speed ratio has realigned with the torque ratio.

Due to the way in which the modelled torque ratio is determined, controlling the engine 20 based on the modified engine speed instead of the real engine speed alters operation of the engine in a controlled manner to provide a desired outcome.

In this respect, the modified engine speed is translated into a torque demand for the engine 20 that provides an uplift in torque that compensates for the variation in the torque ratio during the upshift. This in turn provides the desired output and feel from the transmission 24, which in this case involves a substantially linear change in torque demand to transition smoothly from the torque output before the upshift to the torque output after the upshift. In this embodiment, the required torque demand is implemented via calibrated pedal progression maps, an example of which is shown in FIG. 3.

Figure 3:
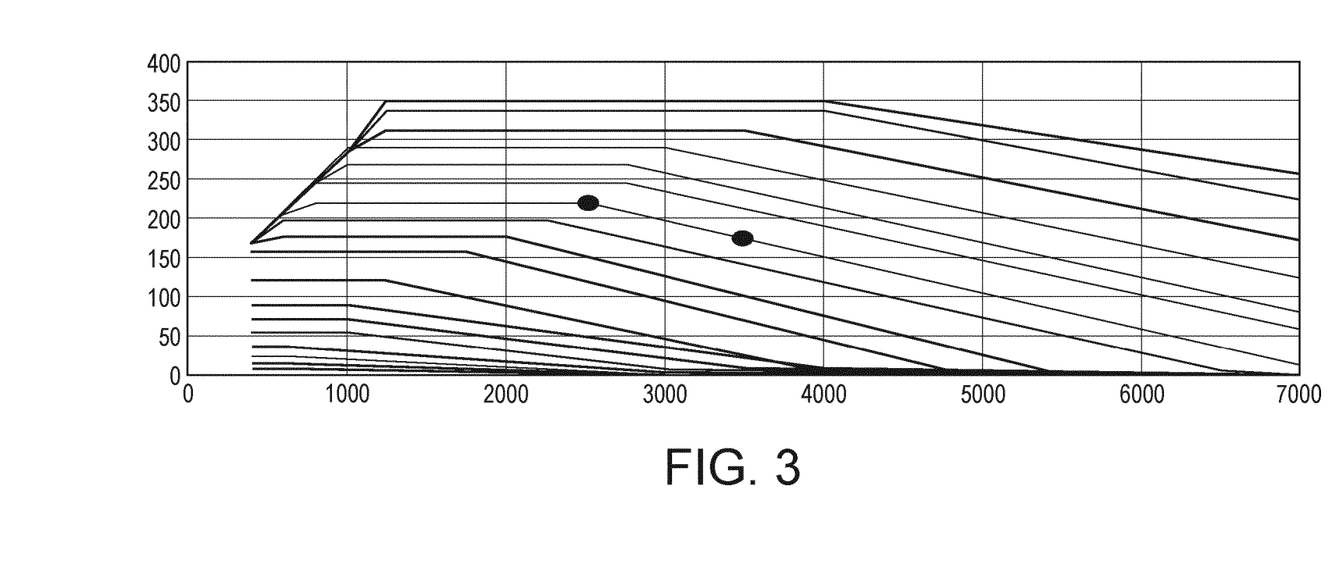
FIG. 3 shows a pedal progression map for use in the vehicle of FIG. 1.

FIG. 3 is a graph that plots engine speed against torque demand for a range of accelerator pedal positions. Such pedal maps can be used with real engine speeds, but in this embodiment the modified engine speed is used instead to alter the torque demand generated by the map. It is noted that the modified engine speed corresponds to the real engine speed outside of gear changes in any event.

Each line on the graph represents a respective pedal angle, with the pedal angles increasing from one line to the next moving upwardly in the graph.

A pair of circles in a line corresponding to 40% driver input represent start and end points for an upshift, by way of example. It is noted that these shift points typically occur at higher engine speeds for higher pedal angles, as is conventional to ensure that the vehicle response adapts to the driver demand as indicated by the accelerator pedal position.

More specifically, one circle of the pair lies at approximately 3500 rpm to represent a point at which an upshift is triggered, at which point the indicated torque demand is 173 Nm. The corresponding circle of the pair is located at approximately 2500 rpm and indicates a torque demand of 219 Nm. It is noted that this engine speed corresponds to the predicted real engine speed at the end of the upshift based on the expected change in torque ratio and instantaneous operating conditions including the transmission state. The predicted engine speed represented by the circle in FIG. 3 is therefore illustrative, and will vary each time an upshift occurs.

The region of the line between the circles corresponds to the modified engine speed during an upshift. As the upshift progresses, the modified engine speed falls during the torque phase 40 as represented by the third plot 48 of FIG. 2. Due to the gradient of the line, this translates into a corresponding rise in the torque demand indicated by the pedal progression map, upon which control of the engine 20 will be based.

In this respect, each line shown in FIG. 3 has a horizontal portion in a region where the vehicle is unlikely to be accelerating if an upshift occurs, indicating that the torque demand is unchanged while the pedal position is held steady in the corresponding engine speed range. Towards the right of FIG. 3, as the engine speed increases each line slopes downwardly at a gradient that is calibrated to provide a linear, inverse relationship between the torque demand and the modified engine speed during an gearshift, that relationship being defined to maintain a prescribed proportion of the transmission output power.

In particular, as FIG. 2 shows the modified engine speed falls immediately once the upshift commences whereas the real engine speed continues to rise, and so increasing the torque demand at this time leads to an increase in engine power output in the initial phase of the upshift. This power increase is used to overcome transmission losses during the torque phase 40, resulting in a smoother real output torque for the transmission 24 and avoiding shuffle in the drivetrain 22.

In the example shown in FIG. 3, the torque demand change resulting from the gradient of the relevant line is calculated to maintain 60% of the torque increase required to maintain constant output power from the transmission 24 during the upshift. This demonstrates how the pedal mapping has been manipulated to provide the change in torque demand required to elicit a desired response in the event of an upshift, or for downshifts in other examples. The specific gradient used in FIG. 3 is selected to provide a desired feel for the driver and is therefore purely illustrative and will vary according to the requirements of each application.

It is also noted that the pedal progression map provides a means for accounting for changes in the driver demand, in that any change in the pedal position during an upshift can be mapped to a new torque demand by moving to the appropriate line of the map shown in FIG. 3, or by interpolating between lines if necessary.

Returning to FIG. 2, a fourth plot 50 represents the actual torque input to the transmission 24, which corresponds to the engine torque output. Meanwhile, a fifth plot 52 represents the torque demand placed on the engine 20 based on the modified engine speed and the pedal progression map, but without compensation for the inertia of engine speed changes. Alongside the fifth plot 52, a sixth plot 54 represents the actual torque without compensation for the engine inertia. The sixth flow 54 closely follows the torque demand over the entire period shown in FIG. 2.

The fourth plot 50 is relatively steady at an initial level in the period preceding the upshift, albeit with a gradual decrease complementing the rise in engine speed leading up to the upshift. Following the upshift, the torque input is at a new, higher level, reflecting the reduced engine speed after the upshift. During these periods, the torque demand represented by the fifth plot 50 corresponds exactly with the torque input to the transmission 24.

During the upshift, the fifth plot 52 rises initially in a complementary manner to the reduction in the modified engine speed, providing an uplift in torque demand at the start of the upshift that compensates for transmission losses during the upshift. After the initial uplift, as the modified engine speed rises the fifth plot 52 reduces gradually—and almost linearly—to meet the new torque level corresponding to the torque output after the upshift. This reflects the impact of determining the torque demand based on the modified engine speed via the pedal progression map, in that the torque demand gradually reduces to the level that will be required once the upshift completes. This is ideal for controlling the engine 20, whose actuators can readily cope with the gradual change in demand.

The actual torque input indicated by the fourth plot 50 matches the torque demand during the torque phase 40 of the upshift. The fourth plot 50 then deviates from the fifth and sixth plots 52, 54 during the inertia phase 42, before realigning at the end of the upshift. In this respect, as noted above the engine torque produced by combustion is reduced in the inertia phase 42 to balance the torque arising from deceleration of the engine 20 due to inertia.

Turning now to FIG. 4, the filter module 60 is shown in simplified block diagram form. As noted above, the filter module 60 is configured to modify the torque demand to counteract the effect of a driveability filter to ensure that the torque compensation applied using the pedal progression map is implemented in the engine 20.

In this embodiment the filter module 60 and its various elements are implemented as functional software blocks within the ECU 33. However, various other implementations are possible, including integration into a different vehicle controller, or provision as a dedicated electronic control unit.

In broad terms, the filter module 60 is configured to take a signal representing the torque demand based on the pedal progression map of FIG. 3, and to modify the signal in such a way that when it is processed by the driveability filter the compensation torque demand remains in the output upon which operation of the engine 20 is based. In other words, the rising trend of the torque demand represented by the fifth plot 52 in FIG. 2 should remain in the signal output from the driveability filter to the ECU 33.

In this respect, the filter module 60 includes a driveability filter 62, which notably is unchanged relative to known filters of this type, as tuning driveability filters represents a significant task. It is therefore a benefit of this embodiment that the filter module 60 allows the predictive technique for managing torque demand during upshifts to be implemented effectively without having to modify the driveability filter 62.

The filter module 60 has an input 64 that receives an input torque demand 66 and a signal indicative of the driver demand 68, namely an indication of the accelerator pedal position. FIG. 4 shows for completeness that the driver demand 68 is also an input to the torque demand 66, in that the torque demand 66 is a signal that is determined from the driver demand 68 and the modified engine speed via the pedal progression map of FIG. 3, as described above.

The filter module 60 further includes an output 70 configured to issue a final torque demand 72 to the ECU 33, which uses the final torque demand 72 to control the engine 20. In broad terms, the filter module 60 acts to process the input torque demand 66 using the driver demand 68 so that the final torque demand 72, having been filtered by the driveability filter 62, represents the required compensation torque demand and a component reflecting the driver demand. Accordingly, the overall effect is that the compensation torque determined via the pedal progression map passes through the driveability filter 62, while variations in the torque demand 66 resulting from corresponding variations in the driver demand 68 are filtered in the usual way.

In this respect, at a fundamental level the filter module 60 adds a modifier value 74 to the input torque demand 66 to produce a modified torque demand 76 that is passed to the driveability filter 62. In turn, the modifier value 74 is based on the driver demand 68, and thereby enables changes in the driver demand 68 to be taken into account.

The modified torque demand 76 is processed by a saturation guard 78 before it reaches the driveability filter 62, the saturation guard 78 being configured to guard the modified torque demand to the minimum torque available from the engine 20 and the maximum torque available at the present engine speed. The saturation guard 78 thus prevents the modified torque demand 76 ever being of a magnitude that would produce greater vehicle acceleration, or response rate, than would be possible if the compensation were not applied. This ensures that the vehicle response is kept within the boundaries of what would have been feasible without applying the compensation, and therefore avoids problems such as poor driveability and shunt of the drivetrain 22.

The driver demand 68 is initially processed by applying a correction factor 80. The correction factor 80 is a function that takes the driver demand 68 as an input and outputs a value between 0 and 1 indicating the variability of the driver demand 68. In this implementation, a value of 1 indicates that the driver demand 68 is constant and a value of 0 indicates that the driver demand 68 is varying rapidly.

The measure of variability indicated by the correction factor 80 is multiplied by a gain 82 and by an error value 84 to produce the modifier value 74.

The gain 82 is a function of a time constant 86 of the driveability filter 62. In this respect, the driveability filter 62 is configured with a variable time constant that adapts according to operating conditions, as is conventional. For example, different time constants may be used for different driving modes. Accordingly, the gain provides a means for neutralising the effect of the instantaneous time constant 86 of the driveability filter 62 to prevent any phase delay arising in the final torque demand 72. Specifically, the gain 82 increases as the time constant 86 increases, in accordance with a calibration.

The error value 84 corresponds to a difference between the input torque demand 66 and the final torque demand 72 post filtering. Incorporating the error value 84 helps to ensure that the final torque demand 72 does not deviate beyond the input torque demand 66. It also means that the modifier value 74 falls to zero when the final torque demand 72 is equal to the input torque demand 66. Accordingly, the filter module 60 does not modify the input torque demand 66 in circumstances in which the driveability filter 62 would have no effect.

Accordingly, the modifier value 74 represents compensation that is added to the input torque demand 66 to counteract the effect of the driveability filter 62. Within this, the correction factor 80 effectively reduces the level of compensation in accordance with the extent to which the driver demand 68 varies. In this respect, if the driver demand 68 varies so greatly that the correction factor drops to 0, the modifier value 74 will also be zero and so the modified torque demand 76 will match the input torque demand 66. In this case, the output from the driveability filter 62 corresponds to operation without the compensation, so that changes in the driver demand 68 are filtered in the normal way. It is noted, however, that a varying driver demand 68 will entail changes to the input torque demand 66, which is determined based on the pedal progression map. This variation in the input torque demand 66 will be reflected in the final torque demand 72, but filtered in the usual way.

In view of the above, the functions contributing towards converting the input torque demand 66 into the modified torque demand 76 that is fed to the driveability filter 62, including the saturation guard 78, collectively define a compensator 88 that processes the input torque demand 66 in a manner to counteracts the effect of the driveability filter 62 to ensure that the torque compensation applied via the input torque demand using the modified engine speed remains in the final torque demand 72 that is sent to the ECU 33.

In the present example, the filter module 60 is integrated into the ECU 33, which also puts the final torque demand 72 into effect in the engine 20. In other embodiments, the final torque demand 72 may be generated and implemented by a single integrated controller such as a PCM, or generated by one controller and then implemented by another controller.

It will be appreciated that various changes and modifications can be made to the present invention without departing from the scope of the present application.

The invention claimed is:

1. A control system comprising one or more controllers, the control system being configured to:
receive a transmission speed signal that is indicative of a transmission output speed during a gearshift;
receive a driver demand signal that is indicative of a driver demand for vehicle acceleration during the gearshift;
determine a torque demand signal for a vehicle engine in accordance with the transmission speed signal and the driver demand signal;
receive an initial gear signal that is indicative of a transmission gear ratio at the start of the gearshift;
receive a target gear signal that is indicative of a target transmission gear ratio;
determine a torque ratio value based on the initial gear signal and the target transmission gear signal;
apply the torque ratio value to the transmission output speed to determine an indicated engine speed, and to determine the torque demand signal in accordance with the indicated engine speed and the driver demand signal; and
wherein the control system is further configured to predict variance in the torque ratio value during the gearshift to determine the torque ratio value.

2. The control system of claim 1, configured to determine the torque ratio value based on an elapsed time since a value of the target gear signal altered.

3. The control system of claim 1, wherein the torque ratio varies during the gearshift.

4. The control system of claim 1, configured to determine the indicated engine speed in accordance with a state of a transmission torque converter.

5. The control system of claim 1, configured to determine the torque demand signal to provide a predetermined change in power output during the gearshift and/or to compensate for a transmission torque loss during the gearshift.

6. The control system of claim 1, comprising:
a signal processor configured to modify the torque demand signal to produce a modified torque demand signal; and
a filter configured to process the modified torque demand signal to produce a filtered torque demand signal for the vehicle engine.

7. The control system of claim 6, wherein the signal processor is configured to add a modifier value to the torque demand signal to produce the modified torque demand signal.

8. The control system of claim 7, wherein the modifier value is a function of any one or more of: a driver demand; a difference between the torque demand signal and the filtered torque demand signal; and a time constant of the filter.

9. A method of operating a vehicle, the method comprising:
receiving a transmission speed signal that is indicative of an output speed of a transmission of the vehicle as the transmission performs a gearshift;
receiving a driver demand signal that is indicative of a driver demand for acceleration of the vehicle during the gearshift;
determining a torque demand signal for an engine of the vehicle in accordance with the transmission speed signal and the driver demand signal;
receiving an initial gear signal that is indicative of a gear ratio of the transmission at the start of the gearshift;
receiving a target gear signal that is indicative of a target gear ratio of the transmission;
determining a torque ratio value based on the initial gear signal and the target gear signal;
applying the torque ratio value to the transmission output speed to determine an indicated engine speed, and determining the torque demand signal in accordance with the indicated engine speed and the driver demand signal; and
predicting variance in the torque ratio value during the gearshift to determine the torque ratio value.

10. A non-transitory, computer-readable storage medium storing instructions that, when executed by one or more electronic processors, causes the one or more electronic processors to carry out the method of claim 9.

11. A vehicle comprising:
a transmission; and
a control system configured to:
receive a transmission speed signal that is indicative of an output speed of the transmission as the transmission performs a gearshift,
receive a driver demand signal that is indicative of a driver demand for acceleration of the vehicle during the gearshift,
determine a torque demand signal for an engine of the vehicle in accordance with the transmission speed signal and the driver demand signal,
receive an initial gear signal that is indicative of a transmission gear ratio of the transmission at the start of the gearshift,
receive a target gear signal that is indicative of a target transmission gear,
determine a torque ratio value based on the initial gear signal and the target transmission gear signal,
apply the torque ratio value to the transmission output speed to determine an indicated engine speed, and to determine the torque demand signal in accordance with the indicated engine speed and the driver demand signal, and
wherein the control system is further configured to predict variance in the torque ratio value during the gearshift to determine the torque ratio value.

* * * * *